US012358778B1

(12) United States Patent
Lawrence et al.

(10) Patent No.: US 12,358,778 B1
(45) Date of Patent: Jul. 15, 2025

(54) APPARATUS, SYSTEMS AND METHODS FOR PREVENTING FUEL STORGE TANKS FROM BEING FILLED WITH THE WRONG TYPE OF FUEL OR WRONG GRADE OF FUEL

(71) Applicant: EMCO WHEATON RETAIL CORPORATION, Wilson, NC (US)

(72) Inventors: James Lee Lawrence, Wilson, NC (US); Joshua William Bensing, Raleigh, NC (US); Christopher Matthew Reese Beck, Raleigh, NC (US)

(73) Assignee: EMCO WHEATON RETAIL CORPORATION, Wilson, NC (US)

( * ) Notice: Subject to any disclaimer, the term of this patent is extended or adjusted under 35 U.S.C. 154(b) by 0 days.

(21) Appl. No.: 18/974,099

(22) Filed: Dec. 9, 2024

(51) Int. Cl.
*B67D 7/06* (2010.01)
*B67D 7/04* (2010.01)

(52) U.S. Cl.
CPC ................. *B67D 7/06* (2013.01); *B67D 7/04* (2013.01); *B67D 2210/00028* (2013.01)

(58) Field of Classification Search
CPC .... B67D 2007/0421; B67D 2007/0428; B67D 2007/0453; B67D 2007/0474
See application file for complete search history.

(56) References Cited

U.S. PATENT DOCUMENTS

| | | | | |
|---|---|---|---|---|
| 5,664,951 A * | 9/1997 | Clary | F16L 37/148 141/382 |
| 6,505,861 B2 * | 1/2003 | Butterfield | F16L 27/08 285/275 |
| 7,950,425 B2 * | 5/2011 | Och | B60K 15/04 141/367 |
| 8,763,656 B2 * | 7/2014 | Ichimaru | B60K 15/04 220/86.2 |
| 9,347,592 B2 * | 5/2016 | Stead | F16L 25/08 |
| 9,927,055 B2 * | 3/2018 | Zonneveld | F16L 37/18 |
| 10,738,925 B2 * | 8/2020 | Parlow | F16L 37/18 |

* cited by examiner

*Primary Examiner* — Timothy L Maust
(74) *Attorney, Agent, or Firm* — Merek, Blackmon & Voorhees, LLC

(57) ABSTRACT

Apparatus, methods and systems designed to prevent fuel storage tanks (above ground or below grade) from being filled or refilled with the wrong type of fuel and/or the wrong grade of fuel by providing a component of a fuel tanker (e.g., drop elbow) and a component of a fuel storage tank (e.g., swivel adapter) that are each specifically and uniquely configured to be product specific, i.e., specific to a particular type or grade of fuel to prevent fuel storage tanks from being filled or refilled with the wrong type and/or the wrong grade of fuel. The component of the fuel tanker and the component of the fuel storage tank may be formed with product specific keys or mating elements that are specific to a particular type or grade of fuel and only mate with a corresponding element or component having the same product specific key or unique mating element.

17 Claims, 8 Drawing Sheets

FIG. 10
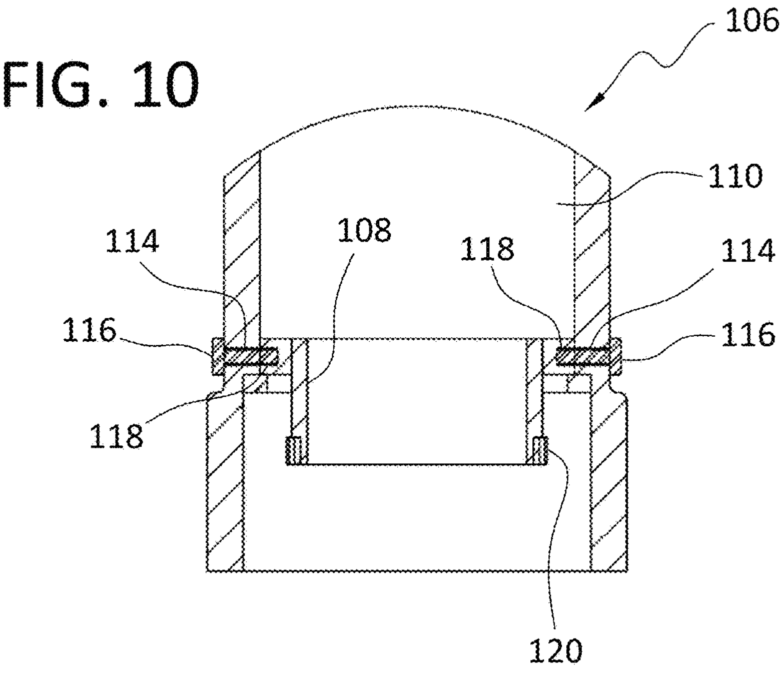
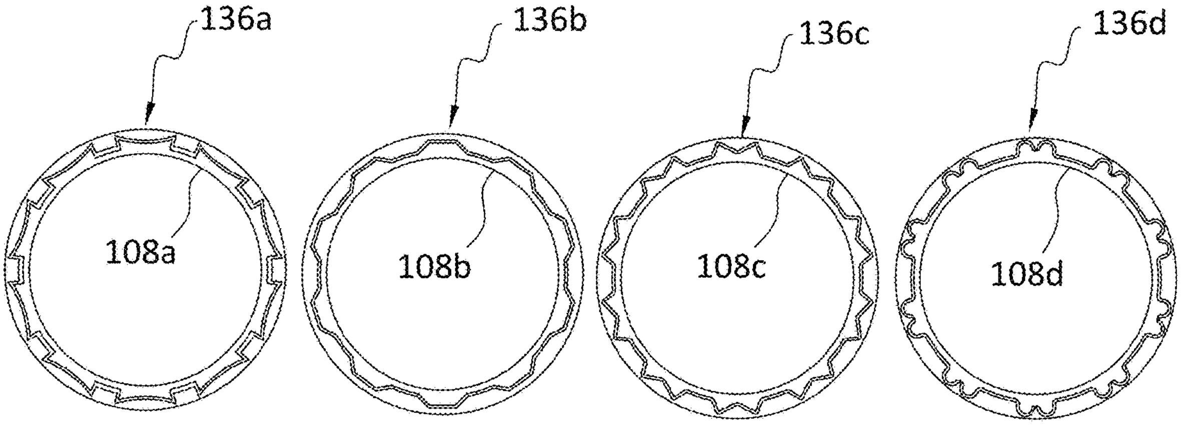
FIG. 11

APPARATUS, SYSTEMS AND METHODS FOR PREVENTING FUEL STORGE TANKS FROM BEING FILLED WITH THE WRONG TYPE OF FUEL OR WRONG GRADE OF FUEL

FIELD OF THE INVENTION

Preferred forms of the present invention are directed to apparatus, methods and systems for preventing fuel storage tanks (below grade or above grade) from being filled or refilled with the wrong fuel type or the wrong fuel grade. Fuel type as used herein refers to a type of fuel (e.g., unleaded gasoline or diesel). Fuel grade as used herein refers to a grade of a particular fuel type (e.g., regular unleaded, premium unleaded or super unleaded).

One preferred method is directed to preventing a fuel storage tank (below grade or above grade) from being filled or refilled with the wrong type of fuel or the wrong grade of fuel. This preferred method includes the steps of providing a first fuel storage tank with a drop elbow connecting component associated with only a first grade of fuel or a first type of fuel and providing a drop elbow associated with a fuel supply truck with a fuel specific component associated with only the first grade of fuel or the first type of fuel to be supplied by the fuel supply truck, wherein the drop elbow at one end is configured to be connected to a fuel supply conduit of the fuel supply truck and at another end is configured to mate with only the drop elbow connecting component of the first fuel storage tank to prevent the first fuel storage tank from being filled or refilled with the wrong grade of fuel or the wrong type of fuel.

Fuel supply truck as used herein refers to any vehicle designed to fill or refill a fuel storage tank (below grade or above grade).

In a most preferred form, the drop elbow connecting component is a swivel adapter mounted on a fill pipe (also referred to as a tank fill riser) of the first fuel storage tank. Preferred methods can employ steps of retrofitting existing drop elbows and swivel adapters to prevent a fuel storage tank from being filled or refilled with the wrong grade of fuel or the wrong type of fuel. Retrofitting existing components (e.g., drop elbows and swivel adapters) has the advantage of utilizing existing components avoiding significant costs and time delays involved in forming new drop elbows and/or swivel adapters. Alternatively, preferred methods can employ steps that create new drop elbows and new swivel adapters or a new component for a swivel adapter that are specific to a particular type of fuel or a particular grade of fuel to prevent one or more fuel storage tanks from being filled or refilled with a fuel different from the correct grade of fuel or the correct type of fuel.

Preferred apparatus of the present invention include, but are not limited to, a new drop elbow or retrofitted drop elbow configured to deliver a specific fuel type or a specific fuel grade and/or a new swivel adapter or a retrofitted swivel adapter configured to receive a specific fuel type or a specific fuel grade to prevent a fuel storage tank (below grade or above grade) from being filled or refilled with the wrong grade of fuel or the wrong type of fuel.

Preferred systems of the present invention include, but are not limited to, equipping service stations, convenience stores and any other fuel supply entity supplying different grades of fuel (e.g., regular unleaded, premium unleaded and super unleaded) and/or different types of fuels (e.g., unleaded gas and diesel) to their customers, with fuel storage tanks (below grade or above grade) each being configured to receive a specific fuel grade or a specific fuel type from fuel supply trucks having drop elbows configured to deliver a specific grade of fuel or a specific type of fuel and mate or connect to a corresponding fuel storage tank to prevent any and all fuel storage tanks (below grade or above grade) of the entity from being filled or refilled with the wrong grade of fuel or the wrong type of fuel. For example, each fuel supply truck having a specific fuel type or specific fuel grade can be equipped with a drop elbow that can only be connected to a fuel storage tank having a corresponding connecting or mating element (e.g., a swivel adapter) to prevent any and all fuel storage tanks (below grade or above grade) of the entity from being filled or refilled with the wrong grade of fuel or the wrong type of fuel.

BACKGROUND OF THE INVENTION

A serious problem is presently being encountered by service stations, convenience stores and other fuel supply entities supplying different grades of fuel (e.g., regular unleaded, premium unleaded and super unleaded) and/or different types of fuels (e.g., unleaded gas and diesel) to their customers. Specifically, during the initial filling or refilling of one or more of the multiple fuel storage tanks (below grade or above grade) of the fuel supplying entity, one or more of the multiple fuel storage tanks is filled or refilled with the wrong type of fuel or the wrong grade of fuel.

For example, regular unleaded gas may be supplied to a premium unleaded gas storage tank. The resulting mixture of the fuels (remaining premium unleaded gas and regular unleaded gas) cannot be sold as the mixture changes the octane rating. Another example is where regular unleaded gas is supplied to a diesel fuel storage tank or vice-a-versa. In this instance, the fuel is completely contaminated.

A fuel supply truck or tanker truck can hold 7000 gallons, so mistakes in filling or refilling a fuel storage tank with the wrong type of fuel or the wrong grade of fuel can be very costly. The unintended mixture must be pumped out and sold at a very low price or disposed of as hazardous waste. Currently the lids and rims of spill containers are API color coded for the fuel type and/or fuel grade. However, this color-coding scheme has not prevented all errors in filling or refilling of fuel storage tanks with the wrong fuel type or the wrong fuel grade.

Accordingly, there exists a significant and immediate need for methods, apparatus and/or systems that prevent filling or refilling of any fuel storage tank (below grade or above grade) with the wrong grade of fuel or the wrong type of fuel.

OBJECTS AND SUMMARY OF THE INVENTION

An object of the present invention is to provide a novel and unobvious apparatus, methods and/or systems.

Another object of a preferred embodiment of the present invention is to provide methods, apparatus and/or systems for preventing a fuel storage tank for storing fuel from being filled or refilled with the wrong grade of fuel or the wrong type of fuel.

A further object of a preferred embodiment of the present invention is to provide methods, apparatus and/or systems which prevent or reduce the likelihood of a drop elbow of a fuel supply truck or tanker truck from being connected to a fuel storage tank having a fuel grade or fuel type different from that to be supplied by the fuel supply truck or tanker truck.

Still a further object of the present invention is to provide a method which includes the steps of providing a first fuel storage tank with a drop elbow connecting component associated with only a first grade of fuel or a first type of fuel and providing a drop elbow associated with a fuel supply truck with a fuel specific component associated with only the first grade of fuel or the first type of fuel to be supplied by the fuel supply truck, wherein the drop elbow at one end is configured to be connected to a fuel supply conduit of the fuel supply truck and at another end is configured to mate with only the drop elbow connecting component of the first fuel storage tank to prevent the first fuel storage tank from being filled or refilled with a wrong grade of fuel or the wrong type of fuel.

Yet another object of a preferred embodiment of the present invention is to provide a system in which a supplier of multiple types of fuels and/or multiple grades of fuels is equipped with multiple fuel storage tanks with each fuel storage tank having a drop elbow connecting component (e.g., swivel adapter) configured to mate with only a corresponding drop elbow supplying a particular grade of fuel or a particular type of fuel.

Still a further object of a preferred embodiment of the present invention is to provide a swivel adapter and/or drop elbow retrofitted or newly formed to prevent a fuel storage tank from being filled or refilled with the wrong grade of fuel or the wrong type of fuel.

Yet a further object of a preferred embodiment of the present invention is to provide a swivel adapter and/or drop elbow with an internal element (i.e., in the fuel flow passageway or fuel path) configured to prevent a fuel storage tank from being filled or refilled with the wrong grade of fuel or the wrong type of fuel.

Yet still another object of a preferred embodiment of the present invention is to provide a swivel adapter and/or drop elbow with an external element (i.e., external to the fuel flow passageway or fuel path) configured to prevent the a fuel storage tank from being filled or refilled with a wrong grade of fuel or wrong type of fuel.

Still a further object of the present invention is to provide a swivel adapter with either an internal element or an external element that is configured to mate and rotate or swivel with a drop elbow having a corresponding configuration.

A further object of the present invention is to provide a swivel adapter having an element that rotates or swivels (with the drop elbow) having one or more through holes or other female receiving sections or portions configured to receive one or more male elements of a corresponding drop elbow.

It must be understood that no one embodiment of the present invention need to include all of the aforementioned objects of the present invention. Rather, a given embodiment may include one or none of the aforementioned objects. Accordingly, these objects are not to be used to limit the scope of the claims of the present invention.

In summary, one preferred embodiment of the present invention is directed to a method for preventing a fuel storage tank for storing fuel from being filled or refilled with a wrong grade of fuel or a wrong type of fuel. The method includes the steps of: (a) providing a first fuel storage tank with a drop elbow connecting component associated with only a first grade of fuel or a first type of fuel; and, (b) providing a drop elbow associated with a fuel supply truck with a fuel specific component associated with only the first grade of fuel or the first type of fuel to be supplied by the fuel supply truck, wherein the drop elbow at one end is configured to be connected to a fuel supply conduit of the fuel supply truck and at another end is configured to mate with only the drop elbow connecting component of the first fuel storage tank to prevent the first fuel storage tank from being filled or refilled with the wrong grade of fuel or the wrong type of fuel.

Another preferred embodiment of the present invention is directed to a swivel adapter for preventing a fuel storage tank for storing fuel from being filled or refilled with a wrong grade of fuel or a wrong type of fuel. The swivel adapter includes a base or lower portion configured to be connected to a fill pipe or tank fill riser of the fuel storage tank and an upper portion configured to rotate relative to the base and to be connected to a drop elbow of a fuel supply truck to rotate or swivel with the drop elbow during filling or refilling of the fuel storage tank, wherein the fuel supply truck supplies a first grade of fuel or a first type of fuel. The swivel adapter further includes a fuel specific key or mating component corresponding to the first grade of fuel or the first type of fuel. The fuel specific key or mating component is configured to only mate with a drop elbow associated with the fuel supply truck supplying the first grade of fuel or the first type of fuel to prevent the fuel storage tank from being filled or refilled with the wrong grade of fuel or the wrong type of fuel.

A further preferred embodiment of the present invention is directed to a system for preventing a plurality of fuel storage tanks for storing fuels of different grades or different types of a fueling site or fueling facility from being filled or refilled with a wrong grade of fuel or a wrong type of fuel. The system includes a plurality of swivel adapters with each of the plurality of swivel adapters being connected to a fuel storage tank configured to store a specific grade of fuel or a specific type of fuel. The plurality of swivel adapters includes a first swivel adapter and a second swivel adapter. The first swivel adapter is connected to a first fuel storage tank for storing a first grade of fuel or a first type of fuel. The second swivel adapter is connected to a second fuel storage tank for storing a second grade of fuel or a second type of fuel, wherein the second grade of fuel or the second type of fuel is different from the first grade of fuel or the first type of fuel. The first swivel adapter is configured to only mate with a first drop elbow providing the first grade of fuel or the first type of fuel and the second swivel adapter is configured to only mate with a second drop elbow providing the second grade of fuel or the second type of fuel.

The above summary describes preferred forms of the present invention and is not in any way to be construed as limiting the claimed inventions to the preferred forms.

BRIEF DESCRIPTION OF THE DRAWINGS

FIG. 10 is a cross-sectional view through a portion of the drop elbow of the second preferred embodiment. Again, portions of the drop elbow have been removed to better see features of the second preferred embodiment.

FIG. 11 are schematic views depicting portions of preferred swivels adapters of the second embodiment connected to portions of preferred drop elbows.

DETAILED DESCRIPTION OF THE PREFERRED EMBODIMENTS OF THE INVENTION

Figure 1:
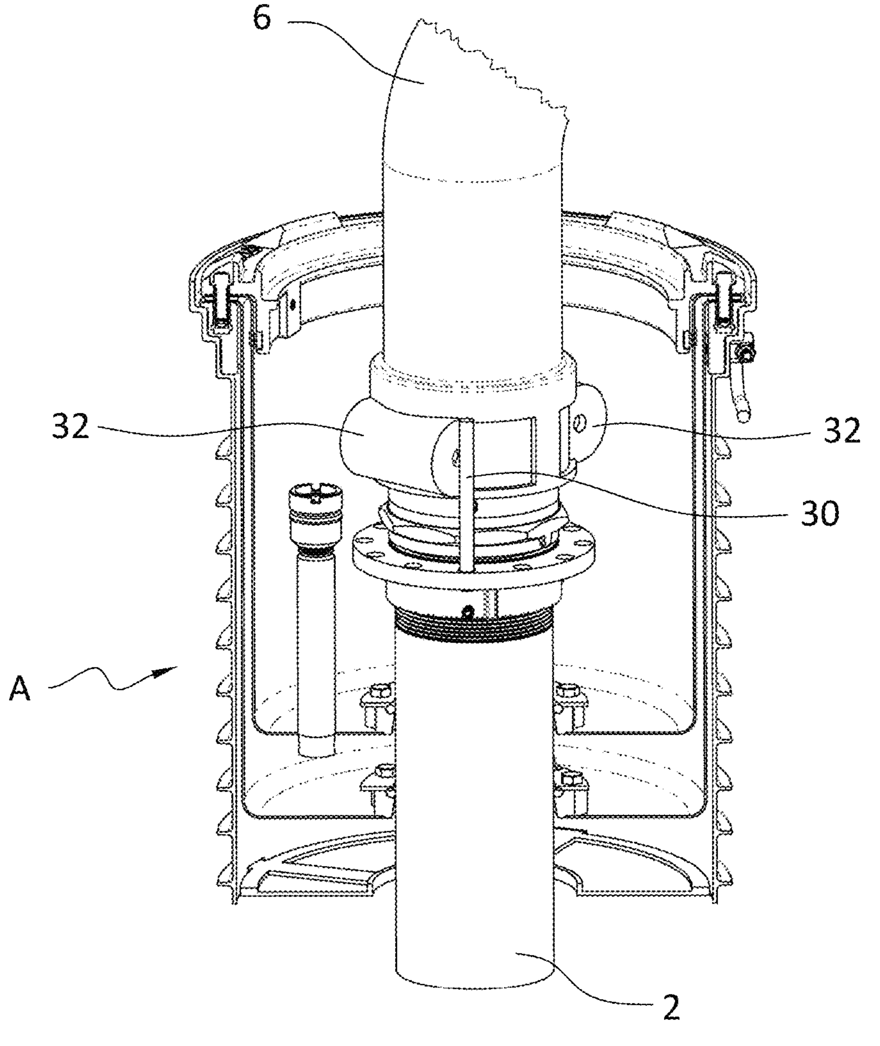
FIG. 1 is a cross-sectional, fragmentary, perspective view of a containment chamber of a fuel storage tank and a portion of a drop elbow of a fuel supply truck or tanker truck connected to a swivel adapter mounted on a fill pipe or tank fill riser formed in accordance with a preferred embodiment of the present invention. Features of the drop elbow (e.g., the connecting or locking element(s) or feature(s)) are not shown so that features of the preferred form of the present invention are better understood.

The preferred forms of the present invention will now be described with reference to FIGS. 1-11. The appended claims are not limited to the preferred forms and no term and/or phrase used herein is to be given a meaning other than its ordinary meaning unless it is expressly stated otherwise.

The present invention is directed to apparatus, methods and systems designed to prevent one or more fuel storage tanks (above ground or below grade) from being filled or refilled with the wrong type of fuel and/or the wrong grade of fuel. Despite existing color-coding schemes presently being employed, fuel storage tanks continue to be filled or refilled with the wrong type of fuel or wrong grade of fuel as these color coding-schemes do not prevent an individual from connecting a drop elbow dispensing a specific fuel type or specific grade of fuel to a fuel storage tank storing a fuel different from the specific fuel type or specific grade of fuel associated with the drop elbow.

The apparatus, methods and systems of the present invention are designed to make it much more difficult if not impossible to connect a drop elbow dispensing a specific fuel type or specific grade of fuel from being connected to a fuel storage tank storing a fuel different from the specific fuel type or specific grade of fuel associated with the drop elbow.

The apparatus, methods and systems of preferred forms of the present invention include providing a fuel storage tank with a product specific mating key or connection component that is specific to a fuel type or specific to a grade of fuel to make it much more difficult if not impossible to connect a drop elbow designed to furnish a fuel different from the specific fuel type or specific grade of fuel associated with the product specific mating key or connection component of the fuel storage tank.

The product specific mating key or connection component can be an element or component of a swivel adapter mounted on or associated with a fill pipe or a tank fill riser of a fuel storage tank. The swivel adapter can be retrofitted with the product specific mating key or connection component or alternatively can be newly formed with the product specific mating key or connection component. The product specific mating key or connection component can be in the fuel flow passageway of the swivel adapter or external to the fuel flow passageway of the swivel adapter. The product specific mating key or connection component can be fixed to an upper element or portion of the swivel adapter that rotates with a drop elbow during a filling or refilling process. The product specific mating key or connection component can be rotatably mounted on a base or lower portion of the swivel adapter that is fixed to and does not rotate relative to the fill pipe or tank fill riser of the fuel storage tank. The product specific mating key or connection component can be a separate component or part of an assembly (i.e., two or more components) that is threaded into or otherwise connected to a lower portion of an existing swivel adapter an upper portion of which rotates or swivels with a corresponding drop elbow during a filling or refilling process.

In addition to equipping the fuel storage tank with a product specific mating key or connection component, preferred forms of the present invention include retrofitting existing drop elbows or newly forming drop elbows with product specific mating keys or connection components that only mate with the product specific mating key or connection component mounted on or associated with a fill pipe or a tank fill riser of a fuel storage tank.

The components described herein are to be formed from a material that is suitable for the particular environment in which the component or components are used. For example, where fuel will pass over or through a component, such component is to be formed from a material suitable for the particular fuel the component or components encounter, e.g. metals conventionally used for forming a component that encounters fuels (e.g., gas or diesel).

FIGS. 1 TO 5

Referring to FIGS. 1 to 5, one of many different forms of a first preferred embodiment of the present invention is depicted. A containment vessel A is associated with a fuel storage tank (not shown) that is disposed below grade or underground. The containment vessel A houses the fill pipe or tank fill riser 2 through which fuel is supplied to the fuel storage tank during a filling or refilling process.

The form and/or construction of containment vessel A can be readily varied and the present invention is not limited to a particular form of containment vessel A. Typically, containment vessel A includes a cover or lid (not shown) that must be removed prior to performing a filling or refilling process. Further, while this embodiment is shown as being associated with a containment vessel A of an underground or below grade fuel storage tank, this embodiment is not limited to use with underground or below grade fuel storage tanks but rather can be used with above ground or above grade fuel storage tanks.

A swivel adapter 4 is mounted on or otherwise operably connected to the fill pipe or tank fill riser 2. This is typically accomplished by threading the female threads of a lower portion of the swivel adapter onto male threads of the fill pipe or tank fill riser. However, the lower portion of the swivel adapter 4 may be threaded on or otherwise connected to an intermediate component (e.g., a spill container having a pipe nipple or male threads configured to mate with or be connected to the lower portion of the swivel adapter) with the intermediate component being directly mounted on the fill pipe or tank fill riser. The spill container A depicted in FIG. 1 does not include a pipe nipple or male threads configured to mate with or be connected to the lower portion of a swivel adapter.

A drop elbow 6 associated with a fuel supply truck or tanker truck is configured to mate and lock to swivel adapter 4 during filling or refilling of a corresponding fuel storage tank. The locking component of the drop elbow 6 is not shown but is well known in this industry.

Figure 2:
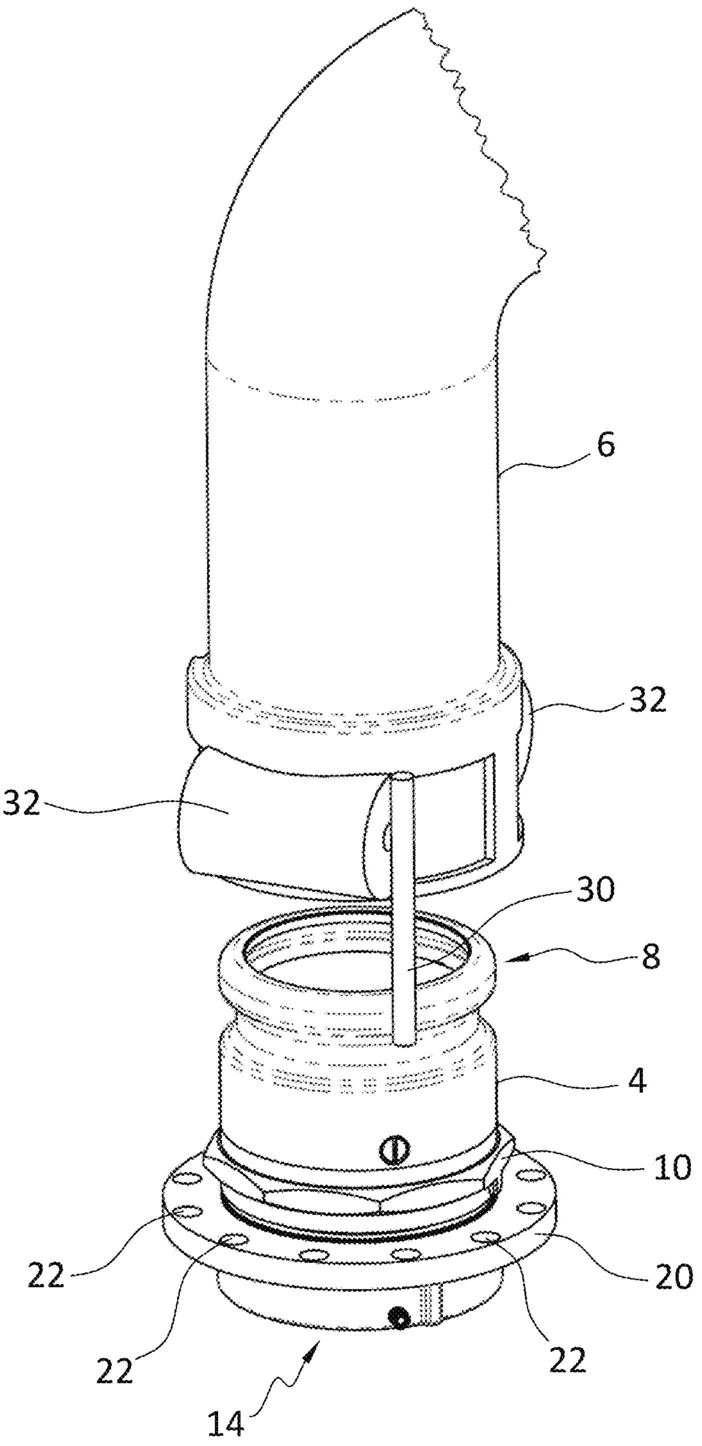
FIG. 2 is a fragmentary, exploded, perspective view of a portion of a drop elbow of a fuel supply truck or tanker truck and a swivel adapter formed in accordance with a preferred embodiment of the present invention depicted in FIG. 1. Features of the drop elbow (e.g., the connecting element) are not shown so that features of this preferred form of the present invention are better understood.

Referring to FIG. 2, swivel adapter 4 includes an upper portion 8, an intermediate portion 10 and a product specific key or component 14. Upper portion 8 is configured to rotate or swivel with a corresponding drop elbow and relative to intermediate portion 10 as is well known in the industry. The upper portion 8 and the intermediate portion 10 are conventional components of a known swivel adapter. In conventional swivel adapter intermediate portion 10 is the lower or base portion of the a conventional swivel adapter.

In a conventional swivel adapter, the female internal threads of intermediate portion 10 are threaded onto or otherwise connected to the fill pipe or tank fill riser 2 or to a spill container having a pipe nipple or male threads configured to mate with or be connected to portion 10 of the swivel adapter if such is present so that intermediate portion 10 does not rotate relative to the fill pipe or tank fill riser 2 but upper portion 8 does rotate relative to the fill pipe or tank fill riser 2. However, in the first preferred embodiment, the female internal threads of intermediate portion 10 are used to connect the product specific key or component 14 to intermediate portion 10. In the first preferred embodiment intermediate portion 10 is not directly connected to the fill pipe or tank fill riser 2 but rather is indirectly connected thereto through the product specific key or component 14.

Figure 4:
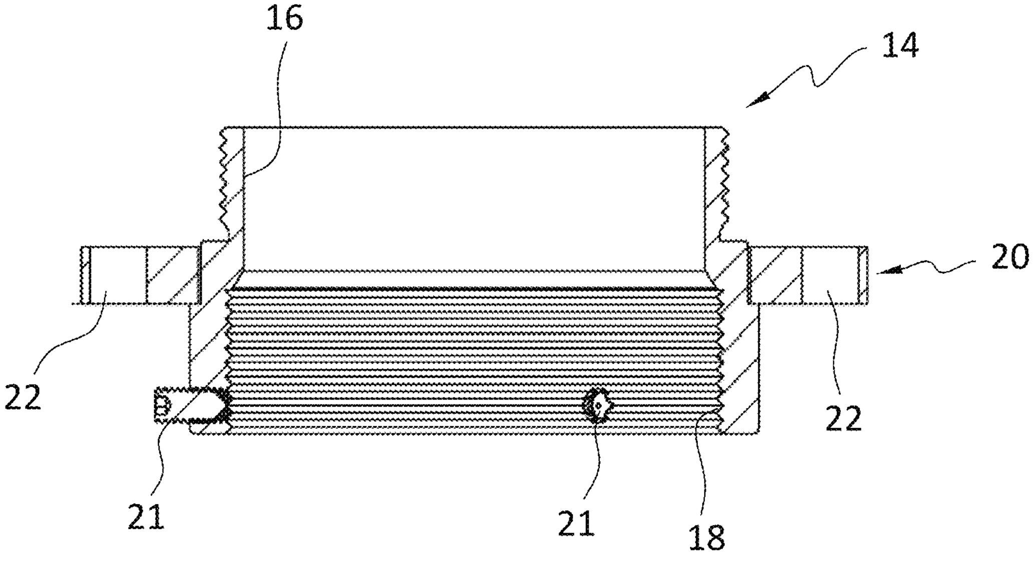
FIG. 4 is a cross-sectional view taken along lines A-A in FIG. 3.

The product specific key or mating component 14 by itself is shown in FIG. 4. An upper threaded portion 16 of the product specific key or mating component 14 is preferably threaded into the female internal threads of intermediate portion 10 of swivel adapter 4. However, any other suitable connection means can be used to connect the product specific key or mating component 14 to intermediate portion 10.

As seen in FIG. 4, the product specific key or mating component 14 includes lower threaded portion 18 that is configured to be threaded onto a fill pipe or tank fill riser 2 and fixed thereto so that portion 16 and portion 18 do not rotate or swivel relative to the fill pipe or the tank fill riser 2. One of more set screws 21 can be used to prevent relative rotation between portion 18 and fill pipe or tank fill riser 2 as well as prevent component 14 from being removed from the fill pipe or tank fill riser 2. However, any other suitable fastener can be used in place of set screws 21.

The product specific key or component 14 includes element 20 that is mounted about an exterior portion of element 14 so that element 20 rotates relative to element or portion 18 as well as portion or element 16 and as such can and will rotate with a corresponding drop elbow during a filling or refilling process. Preferably portions 16 and 18 are formed from a single piece of material (e.g., bronze, stainless steel, aluminum, nickel or any other suitable material including but not limited to plastics).

Figure 3:
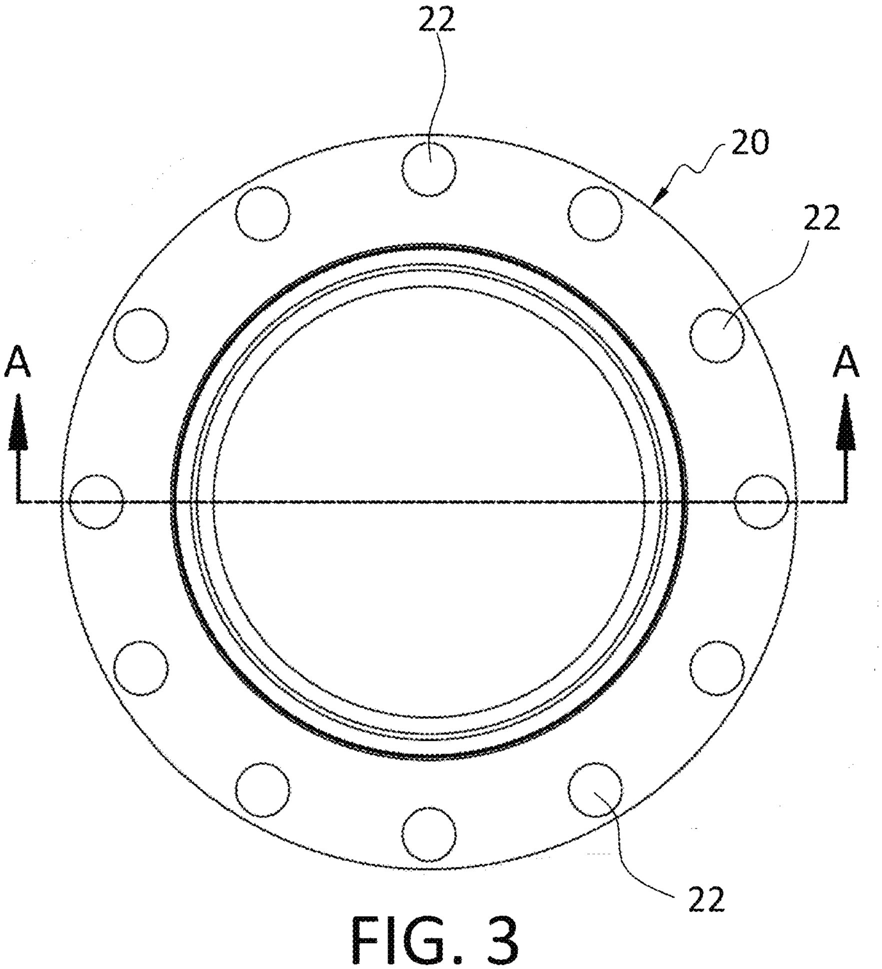
FIG. 3 is a plan view of a lower portion or lower element of one preferred swivel adapter.

Rotatable element 20 includes one or more female receiving portions or sections 22. In FIG. 3, the one or more female receiving portions or sections 22 are shown as cylindrical through openings extending through rotatable element 20. The cylindrically shaped/configured female receiving portions or sections 22 are configured to only receive a corresponding cylindrical product specific key or component 30 of drop elbow 6 as seen FIGS. 1 and 2.

Referring to FIGS. 1 and 2, drop elbow 6 has been retrofitted with two cylindrical product specific keys or components 30 only one of which is shown. The other cylindrical product specific key or component (not shown) is preferably positioned or disposed directly opposite cylindrically shaped product specific key or component 30. Existing members 32 of a conventional drop elbow are utilized as the attachment point for the two cylindrical product specific keys or components 30.

Preferably, one product specific key 30 is fixed by welding or otherwise to the corresponding member 32. Hence, neither of the members 32 nor the corresponding component 30 rotate relative to drop elbow 6 but rather these components rotate with drop elbow 6.

Both component 30 and member 32 rotate with drop elbow 6. While two product specific keys or mating components 30 are preferred, one product specific key or component 30 or more than two product specific keys or components 30 can be utilized. Preferably, the female receiving portions or sections 22 are uniformly spaced from each other and about element or member 20 of key or component 14. By having more female receiving portions or sections 22 associated with the swivel adapter than the number of product specific keys or components 30 associated with the drop elbow, connection of the drop elbow 6 with the swivel adapter 4 will be facilitated or made easier as the manipulation of the drop elbow 6 to align and connect components 30 to a corresponding receiving section 22 will be minimal.

Referring to FIG. 1, a lower portion of component 30 is shown as being received by the corresponding female receiving portion or section 22 (i.e., the lower portion of component 30 extends into portion of section 22) to connect or mate drop elbow 6 with swivel adapter 4 so that member 20 can and will rotate with drop elbow 6 during a filling or refilling process while the other portions of swivel adapter 4 do not rotate with drop elbow 6 (i.e., upper threaded portion 16 and lower threaded portion 18).

By configuring member 14 with one end that can be readily threaded into the a conventional swivel adapter and the other end that can be readily threaded on a fill pipe or tank fill riser, virtually any existing swivel adapter can be readily retrofitted with member 14 to form a swivel adapter that is product specific, i.e., specific to a particular fuel type and/or fuel grade.

Figure 5:
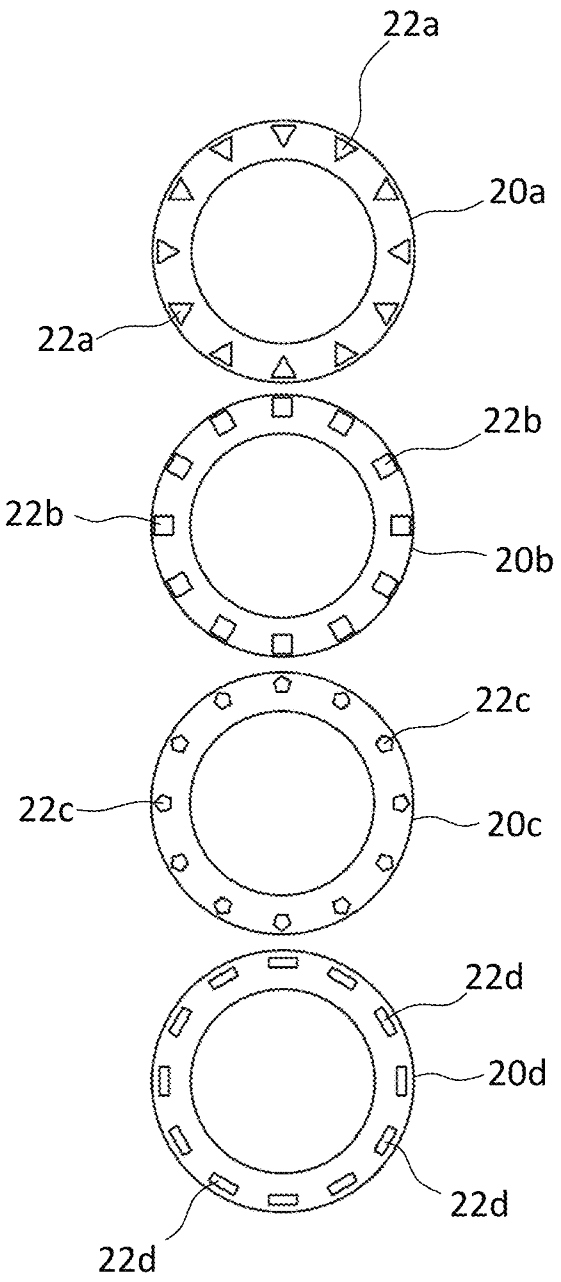
FIG. 5 depicts plan views of product specific external components of preferred swivel adapters that mate with corresponding drop elbows having a corresponding product specific mating element to differentiate fuel types and/or fuel grades to prevent fuel storage tanks from being filled or refilled with the wrong type of fuel and/or the wrong grade of fuel.

Referring to FIG. 5, alternative forms of the rotatable member, segment or section 20 of the product specific key or component 14 are shown. Specifically, rotatable member **20*a* includes triangular shaped through openings 22*a*. Rotatable member 20*b* includes square shaped through openings 22*b*. Rotatable member 20*c* includes pentagonal shaped through openings 22*c*. Rotatable member 20*d* includes rectangular shaped through openings 22*d* having a shape different from the square through openings 22*b*. While each of the through openings 22, 22*a*, 22*b*, 22*c* and 22*d* are shown as having a closed perimeter (see FIGS. 1 to 5**), i.e., the outermost portion of each of the through openings is spaced inwardly from an outermost surface of the corresponding rotatable member, the through openings could be formed in the corresponding rotatable member so that an outermost portion, section or segment of the through openings is open rather than closed to facilitate connection with a corresponding drop elbow.

Drop elbows associated with different fuel types and/or different fuel grades would have product specific keys or components having the same or a complimentary shape to the corresponding product specific key or component of the swivel adapter.

For example, circular or cylindrical through openings 22 and the cylindrical product specific key or component 30 can be specific or unique to regular unleaded gas having 87 octane and the square shaped through openings 22 and complimentary square shaped product specific key component of the drop elbow can be specific or unique to plus unleaded gas having 89 octane to readily differentiate between two different grades of fuel, i.e., unleaded gas having an octane of 87 and unleaded gas having an octane of 89.

Alternatively, circular or cylindrical through openings 22 and the corresponding cylindrical product specific key or component 30 can be specific or unique to regular unleaded gas having 87 octane and the square shaped through openings 22*b* and complimentary square shaped product specific key component of the drop elbow can be specific or unique to diesel fuel to readily differentiate between two different types of fuel, i.e., unleaded gas and diesel. As will be readily appreciated, other mating elements can be used other than the through openings associated with the fuel storage tank and corresponding pins or male elements associated with the drop elbow shown in FIGS. 1 to 5.

By providing different product specific keys or components for each of the different fuel storage tanks (i.e., fuel storage tanks with different grades or types of fuel) and by providing different product specific keys or components for each of the different tanker trucks (i.e., tanker trucks supplying different grades or types of fuel) a fuel dispensing entity (e.g., a filling station or convenience store) can greatly reduce if not eliminate any fuel storage tank from being filled or refilled with the wrong type and/or wrong grade of fuel.

While the first preferred embodiment depicted in FIGS. 1 to 5 illustrates a retrofitted swivel adapter and a retrofitted drop elbow, the swivel adapter and/or drop elbow can be newly manufactured to have the mating product specific keys or components.

It is to be understood that service stations, convenience stores and any other fuel supply entity supplying more than two different grade of fuel and/or more than two different types of fuel employing the present invention would provide each fuel storage tank with a product specific key or component to be specific or unique to the type or grade of fuel to be stored and provide or require each tanker truck to have a product specific key or component to be specific or unique to the type or grade of fuel to the type or grade of fuel supplied by the tanker truck that connects with only the corresponding product specific key or component of each fuel storage tank.

FIGS. 6 TO 11

Referring to FIGS. 6 to 11, one of many different forms of a second preferred embodiment will be described. The containment vessel and fill pipe or tank fill riser associated with a below grade or underground fuel storage tank have been omitted. However, it is to be understood that the second preferred embodiment can be used in connection with above grade or above ground fuels storage tanks as well as below grade or underground fuel storage tanks. Further, while the drop elbow and swivel adapter of the second preferred embodiment are shown and described as being existing components that are retrofitted to make it much more difficult if not impossible to fill or refill any fuel storage tank with the wrong type or wrong grade of fuel, the drop elbow and/or the swivel adapter can be newly formed or newly manufactured as is the case with the first preferred embodiment depicted in FIGS. 1 to 5.

Figure 6:
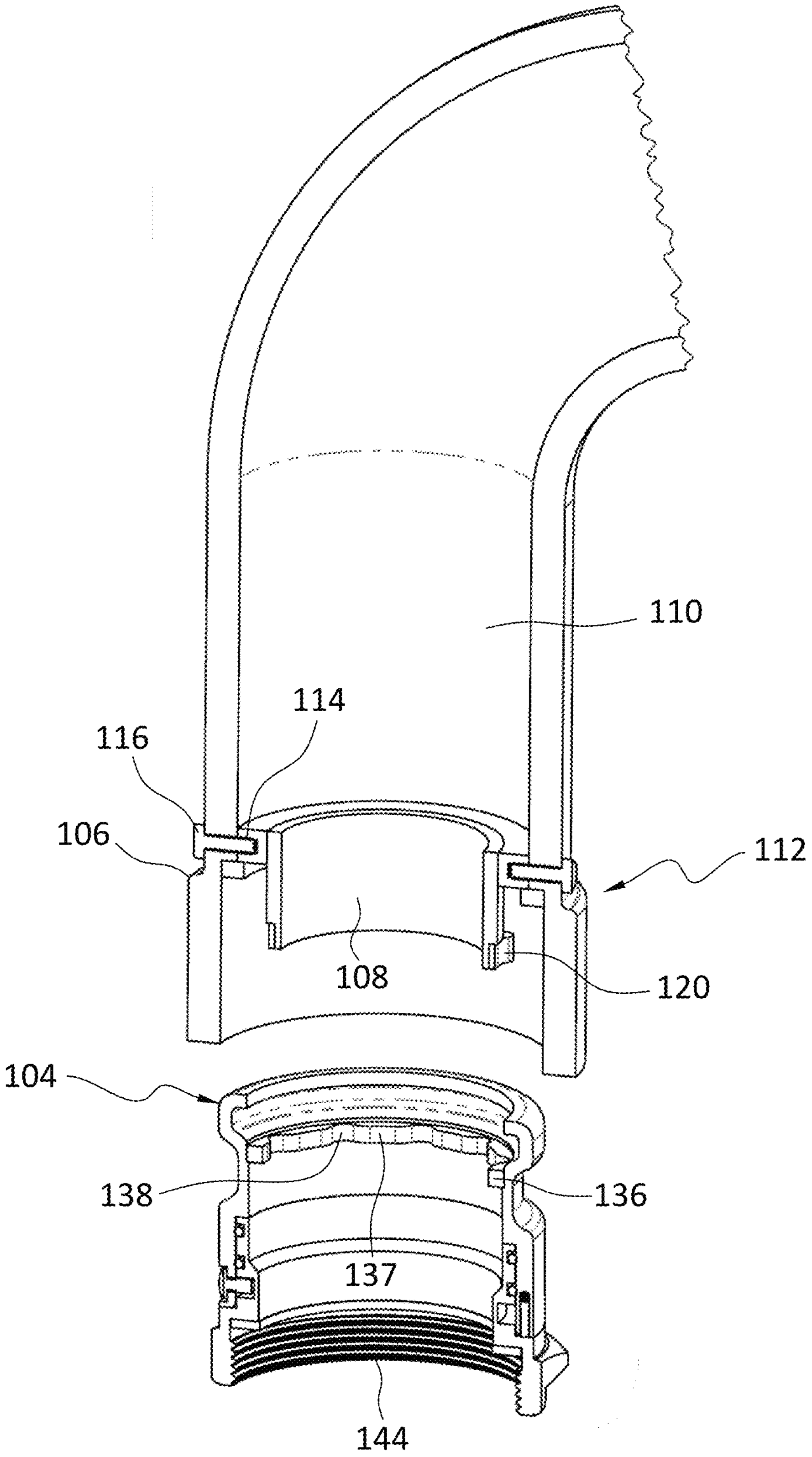
FIG. 6 is a fragmentary, exploded perspective view of a portion of a drop elbow of a fuel supply truck or tanker truck and a swivel adapter formed in accordance with a second preferred embodiment of the present invention. Features of the drop elbow (e.g., the connecting element) are not shown so that features of this embodiment of the present invention are better seen.
Figure 7:
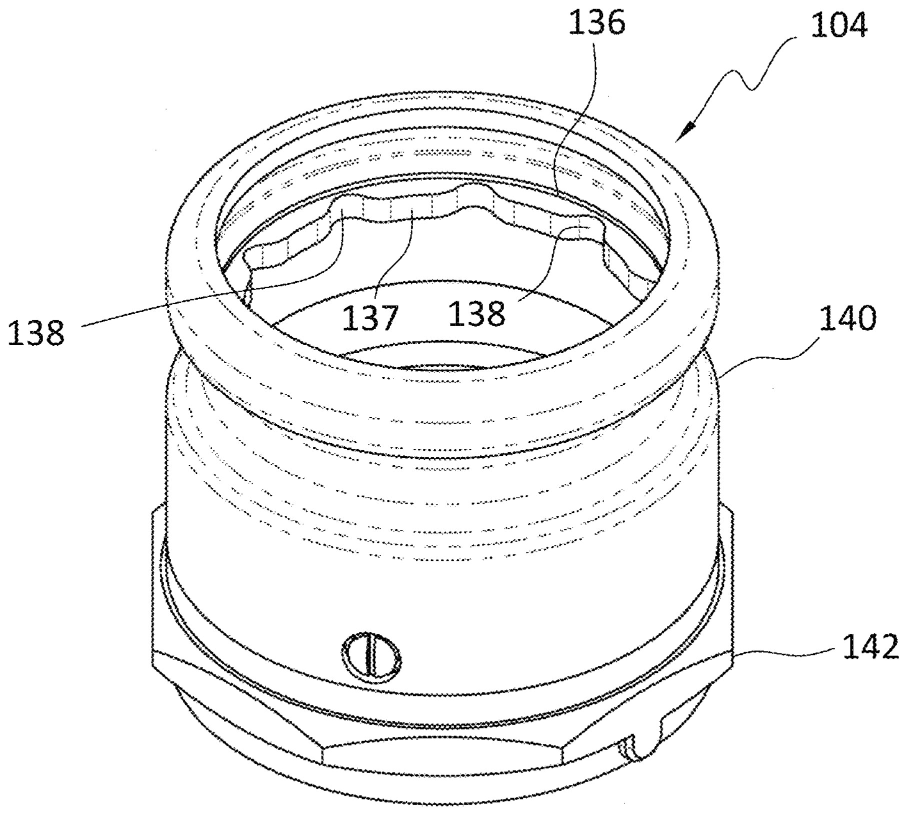
FIG. 7 is a perspective view of the swivel adapter depicted in FIG. 6.

Referring to FIG. 6, a portion of a drop elbow 106 of the second preferred embodiment is shown directly above and in vertical alignment with swivel adapter 104 of the second preferred embodiment. As is the case with the first preferred embodiment depicted in FIGS. 1 to 5, various features or components (e.g., locking component(s) or feature(s)) of drop elbow 106 have been omitted to better understand the second preferred embodiment.

Unlike the first preferred embodiment depicted in FIGS. 1 to 5 having rotatable element 20 with female receiving through holes 22 and the corresponding drop elbow 6 having mating components 30 (preferably two but only one being shown) which are external to the fuel flow passageways of both the drop elbow 6 and swivel adapter 4, the product specific keys or mating components of the drop elbow 106 and swivel adapter 104 of the second preferred embodiment are disposed in the corresponding fuel passageway of the drop elbow 106 and swivel adapter 104. This configuration of the second preferred embodiment has the advantage that both product specific keys or mating components (i.e., drop elbow and swivel adapter) are internal and, therefore, protected from damage.

The configuration of the first preferred embodiment has the advantage that the fuel passageways of both the swivel adapter and the drop elbow are identical to conventional drop elbows and swivel adapters, i.e., there is no obstruction or element in the fuel passageways of either the swivel adapter or the drop elbow of the first preferred embodiment.

Any conventional drop elbow can be readily retrofitted to be product specific, i.e., be specific or unique to a particular type of fuel or a particular grade of fuel by attaching drop elbow insert 108 to a conventional drop elbow. As shown in FIGS. 6 and 10, insert 108 is attached in a manner where insert 108 is disposed in fuel passageway 110 of drop elbow 106 at a lower portion 112 of drop elbow 106.

Insert 108 can be attached to drop elbow 106 by any conventional attachment means or any subsequently developed attachment means designed to connect two components. Insert 108 is a hollow annular member with an upper portion that radially projects outwardly from the fuel flow passageway formed by the hollow portion of the insert 108 and an annular hollow lower portion extends downwardly from the hollow and annular upper portion.

In the second preferred embodiment, one or more horizontally extending through holes 114 (e.g., two horizontally or radially extending through holes) are formed in the wall of drop elbow 106 to allow pins or screws 116 to be connected to or mate with corresponding apertures 118 formed in the outwardly projecting upper portion of insert 108 to fix insert 108 to drop elbow 106 so that insert 108 rotates or moves with drop elbow 106. Preferably, insert 108 includes a lower exterior surface 120 that is configured to be product specific, i.e., specific or unique to a particular fuel type or grade of fuel. Insert 108 can be formed from multiple pieces or a single piece of material.

Figure 9:
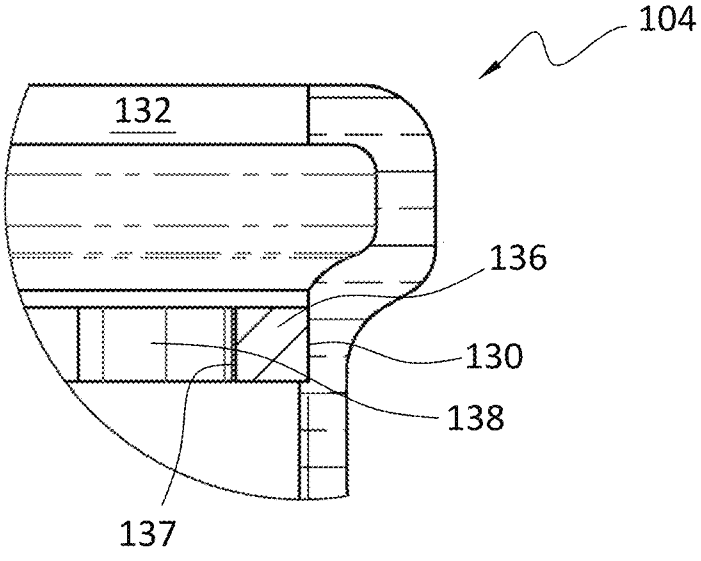
FIG. 9 is an enlarged cross-sectional view of an upper portion of the swivel adapter depicted in FIG. 6.

Swivel adapter 104 is formed by machining or otherwise manipulating an upper portion 130 of internal fuel passageway 132 of a conventional swivel adapter to have an annular ledge, lip or seat 134 (see FIG. 9). Seat 134 receives insert 136 formed in accordance with the present invention to be product specific. Seat 134 is configured so that insert 136 cannot be moved below the annular ledge, lip or seat 134. As opposed to machining an upper portion 130 of internal fuel passageway 132, insert 136 can be fastened to swivel adapter 104 in a manner that is the same or similar to the above-described manner for connecting insert 108 to drop elbow 106.

Preferably, insert 136 is a hollow annular member that is formed from a single piece of material that is compatible with the fuel that insert 136 will be exposed to during use.

Insert 136 is configured to be product specific, i.e., specific or unique to a particular fuel type or grade of fuel. In the second preferred embodiment, insert 136 includes an inner peripheral surface 137 having one or more female receiving portions, sections or segments 138 that are complimentary to radially projecting male portions, sections or segments of exterior surface 120 of insert 108 of drop elbow 106 so that the corresponding male portion, section or segment can be received in corresponding female receiving portions, sections or segments 138. Preferably, an uppermost portion and a lowermost portion of exterior surface 120 are horizontally aligned with an uppermost portion and a lowermost portion of inner surface 137, respectively (i.e., the height of exterior surface 120 is equal to the height of inner surface 137).

Figure 8:
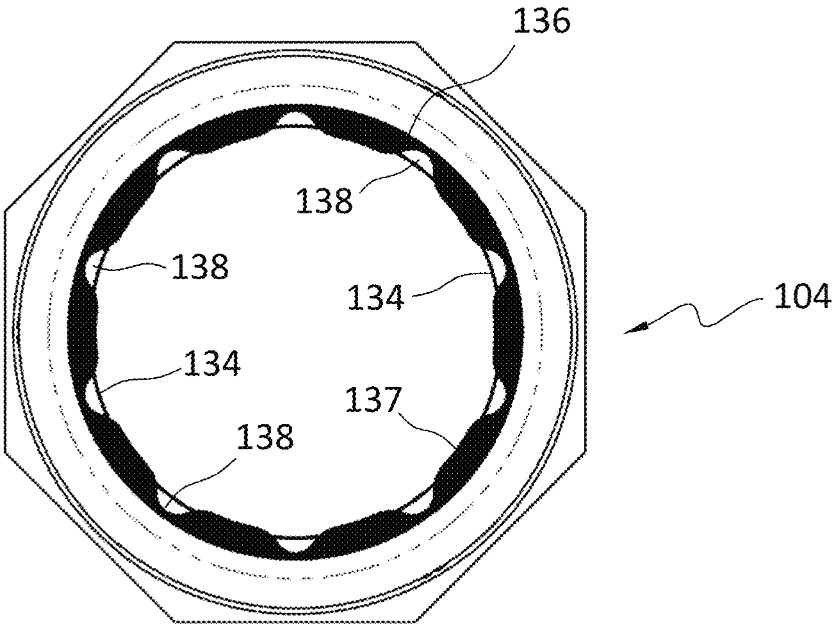
FIG. 8 is a plan view of the swivel adapter depicted in FIG. 6.

Portions 138, as seen in FIG. 8, are arcuate recesses having a particular curvature or configuration that extends the entire height of insert 136. The male projecting portions, segments or section of insert 108 are to be shaped complimentary to arcuate recesses 138 to allow arcuate recesses 138 to receive the male projecting portions, segments or sections of insert 108. A portion of the lowermost surface of the male projecting portions, segments or section of insert 108 can be configured to directly contact an uppermost portion of ledge, seat or lip 134.

It is to be understood that the height of exterior surface 120 could be greater than or less than the height of inner surface 137. In any event, at least a portion of exterior surface 120 is horizontally aligned with at least a portion of inner surface 137 to create a complimentary mating connection between surface 120 and surface 137 and, hence a mating connection of drop elbow 106 and swivel adapter 104.

Insert 136 is preferably press fit into a corresponding portion of the internal fuel passageway 132 so that insert 136 rotates or swivels with upper portion 140 of swivel adapter 104 that is rotatably mounted on base or lower portion 142 mounted on the fill pipe or the tank fill riser of a fuel storage tank. The base or lower portion 142 having internal threads 144 as is conventional is threaded on and fixed to the fill pipe or the tank fill riser of a fuel storage tank preventing relative rotation between the base or lower portion 142 and the fill pipe or the tank fill riser of a fuel storage tank.

It is to be understood that the insert 136 can be connected to upper portion 140 in numerous ways other than press fitting so that insert 136 rotates with upper portion 140 including but not limited to welding or any other suitable connection means including one or more fasteners (e.g., screws or pins).

Preferably, insert 108 and/or insert 136 are disposed or positioned so that a drop elbow cannot lock onto a swivel adapter of a fuel storage tank that stores a fuel type or fuel grade that is different from the fuel type or fuel grade of the drop elbow. In other words, inserts 108 and 106 are positioned such that external surface 120 must be horizontally aligned with surface 137 before the locking mechanism of the drop elbow can be used to lock the drop elbow to the swivel adapter.

For example, insert 136 of the swivel adapter 104 can be located at a position where if a drop elbow does not include a component (i.e., complimentary component) that will extend into and be received by the female mating component or components 138 of insert 136, the drop elbow cannot be locked to the swivel adapter making it virtually impossible to fill or refill a fuel storage tank with the wrong type of fuel or the wrong grade of fuel.

Notably, the first preferred embodiment depicted in FIGS. 1 to 5 can be readily configured in the same or similar manner to prevent a drop elbow from being connected to the wrong fuel storage tank.

FIG. 11 schematically depicts the mating connection of four different inserts for drop elbows and four corresponding inserts of the swivel adapters to allow each of the depicted inserts of the drop elbow and the inserts of the swivel adapter to be specific or unique to a type of fuel or a grade of fuel different from the type of fuel or grade of fuel associated with insert 108 and insert 136.

In each of the four different mating configurations shown in FIG. 11 for the inserts for drop elbows and the inserts for swivel adapters, the inner peripheral surface of the insert for the swivel adapter and the exterior peripheral surface of the insert for drop elbow has a configuration specific or unique to a particular type or grade of fuel.

For example, inserts 108 and 136 can be specific or unique to unleaded gas having a grade of 87 octane, insert 108*a* and insert 136*a* can be specific or unique to unleaded gas having a grade of 89 octane, inserts 108*b* and 136*b* can be specific or unique to unleaded gas having a grade of 93 octane, inserts 108*c* and 136*c* can be specific or unique to unleaded gas having a grade of 88 octane and inserts 108*d* and 136*d* can be specific or unique to diesel fuel.

Notably, the grade or type or type of fuel that is associated with the combination of inserts for the drop elbow and the swivel adapter can be readily varied as desired to meet the needs of any entity providing different types of fuel and/or different grades of fuel. For example, where the entity providing different types of fuel and/or different grades of fuel provides different grades of diesel fuel (e.g., truck diesel, auto diesel and/or diesel exhaust fluid), the inserts of the drop elbow and swivel adapter can be suitably configured to differentiate between the different grades of diesel fuel.

While FIGS. 6 to 11 depict a retrofitted embodiment (i.e., existing drop elbows and swivel adapters are retrofitted), the drop elbow and swivel adapter can be newly formed to utilize the present invention. For example, a lower section of the inner wall of a new drop elbow can be manufactured to have the shape of surface 120. Similarly, an upper section of the inner wall of the swivel adapter can be manufactured to have the shape of surface 137 so that no insert is needed to create a product specific drop elbow and a product specific swivel adapter.

While this invention has been described as having a preferred design, it is understood that the preferred design can be further modified or adapted following in general the principles of the invention and including but not limited to such departures from the present invention as come within the known or customary practice in the art to which the invention pertains. The claims are not limited to the preferred embodiments and have been written to preclude such a narrow construction using the principles of claim differentiation.

We claim:

1. A method for preventing a fuel storage tank for storing fuel from being filled or refilled with a wrong grade of fuel or a wrong type of fuel, said method comprising:

(a) providing a first fuel storage tank with a drop elbow connecting component associated with only a first grade of fuel or a first type of fuel, wherein the drop elbow connecting component is a swivel adapter having an upper portion, an intermediate portion and a product specific key component associated with only the first grade or the first type of fuel, the intermediate portion having internal threads, the product specific key component having an upper section with external threads so that said product specific key component can be threaded into said intermediate portion, said product specific key component further having internal threads so that said product specific key component can be threaded onto a corresponding portion of said first fuel supply tank, said upper portion being configured to rotate relative to both said intermediate portion and said product specific key component; and, (b) providing a drop elbow associated with a fuel supply truck with a fuel specific component associated with only the first grade of fuel or the first type of fuel to be supplied by the fuel supply truck, wherein the drop elbow at one end is configured to be connected to a fuel supply conduit of the fuel supply truck and at another end is configured to mate with only said product specific key of said swivel adapter of the first fuel storage tank to prevent the first fuel storage tank from being filled or refilled with the wrong grade of fuel or the wrong type of fuel.

2. The method of claim 1, wherein:

(a) said product specific key component includes an annular member having a plurality of openings.

3. The method of claim 2, wherein:

(a) said plurality of openings of said annular member are removed from a fuel passageway of the swivel adapter.

4. The method of claim 3, wherein:

(a) the drop elbow includes a plurality of pins, each of the plurality of pins being configured to mate with a corresponding one of said plurality of openings.

5. The method of claim 2, wherein:

(a) said plurality of openings are through holes extending through said annular member.

6. The method of claim 4, wherein:

(a) each of said plurality of pins extends along an exterior surface of said upper portion of the swivel adapter and an exterior surface of said intermediate portion of said swivel adapter.

7. The method of claim 1, including the further steps of:

(a) retrofitting an existing drop elbow to create a first retrofitted drop elbow specific to the first grade of fuel or the first type of fuel; and, (b) retrofitting an existing swivel adapter to create a first retrofitted swivel adapter that only mates with the first retrofitted drop elbow.

8. A method for preventing a fuel storage tank for storing fuel from being filled or refilled with a wrong grade of fuel or a wrong type of fuel, said method comprising:

(a) providing an existing swivel adapter having an upper portion configured to be connected to a drop elbow associated with a fuel supply truck and rotate with the drop elbow and a base portion configured to be threaded onto a fill pipe of a fuel supply tank or other component associated with the fuel supply tank so that said base portion does not rotate with the upper portion or the drop elbow connected to the upper portion, wherein the existing swivel adapter can be connected to a drop pipe regardless of the grade or type of fuel to be supplied using the drop pipe;

(b) retrofitting the existing swivel adapter by forming an inner, annular ledge, lip or seat in the upper portion and inserting into the upper portion an annular fuel specific component associated with only a first fuel grade or first fuel type such that said annular fuel specific component is supported by the inner annular ledge, lip or seat;

(c) providing a first fuel storage tank with the retrofitted swivel adapter formed by step (b); and, (d) providing a drop elbow associated with a fuel supply truck with an internal fuel specific component associated with only the first grade of fuel or the first type of fuel to be supplied by the fuel supply truck, wherein the drop elbow at one end is configured to be connected to a fuel supply conduit of the fuel supply truck and at another end is configured to mate with only said annular fuel specific component of said swivel adapter of the first fuel storage tank to prevent the first fuel storage tank from being filled or refilled with the wrong grade of fuel or the wrong type of fuel, said internal fuel specific component includes an annular, peripheral surface disposed above an outlet end of the drop pipe, the annular, peripheral surface being configured to only mate with an inner annular surface of said annular fuel specific component of said swivel adapter.

9. The method of claim 8, wherein:

(a) an uppermost surface of the annular fuel specific component is disposed below an uppermost surface of the upper portion of the existing swivel adapter.

10. The method of claim 8, wherein:

(a) the annular fuel specific component is press fit into the upper portion of the existing swivel adapter.

11. The method of claim 8, wherein:

(a) the inner annular surface of said annular fuel specific component of said swivel adapter includes one or more female receiving sections;

(b) the annular, peripheral surface of the internal fuel specific component of the drop elbow includes one or more radially projecting male sections that only mate with a corresponding one of the one or more female receiving sections.

12. The method claim 11, wherein:

(a) the one or more radially projecting male sections form a lower portion of the internal fuel specific component of the drop elbow.

13. The method claim 11, wherein:

(a) the one or more female receiving sections have a height equal to a height of a corresponding one of the one or more radially projecting male sections.

14. The method claim 8, further including the step of:

(a) detachably connecting the internal fuel specific component to an existing drop elbow.

15. The method claim 14, wherein:

(a) the internal fuel specific component has a fuel flow passageway and an upper radially projecting portion and a lower radially projecting portion, the upper radially projecting portion projects outwardly from the fuel flow passageway a distance greater than a distance the lower radially projection portion projects outwardly from the fuel flow passageway.

16. The method claim 14, wherein:

(a) the step of detachably connecting the internal fuel specific component to an existing drop elbow includes forming a plurality of through holes in a wall of the drop pipe, providing a plurality of fasteners and inserting one of the plurality of fasteners into each of the plurality of through holes to engage a corresponding aperture in the upper radially projecting portion.

17. The method claim 14, wherein:

(a) the drop elbow includes a fuel inlet and a fuel outlet, and a lowermost portion of internal fuel specific component is offset inwardly from the fuel outlet so that the internal fuel specific component is entirely housed within the existing drop elbow.

* * * * *